US 9,794,861 B2

(12) United States Patent
Kumar et al.

(10) Patent No.: US 9,794,861 B2
(45) Date of Patent: Oct. 17, 2017

(54) SYSTEM INFORMATION MESSAGE COMMUNICATION BY DYNAMIC SEGMENTING OF SI MESSAGES IN A WIRELESS COMMUNICATION SYSTEM

(71) Applicant: TEJAS NETWORKS LIMITED, Bangalore (IN)

(72) Inventors: Vinod M. Kumar, Bangalore (IN); Rohith V. Hegde, Bangalore (IN)

(73) Assignee: TEJAS NETWORKS LIMITED, Bangalore (IN)

( * ) Notice: Subject to any disclaimer, the term of this patent is extended or adjusted under 35 U.S.C. 154(b) by 0 days.

(21) Appl. No.: 14/231,641

(22) Filed: Mar. 31, 2014

(65) Prior Publication Data
US 2014/0293908 A1   Oct. 2, 2014

(51) Int. Cl.
*H04W 48/12*     (2009.01)
*H04W 72/12*     (2009.01)
*H04W 36/00*     (2009.01)
*H04W 72/04*     (2009.01)

(52) U.S. Cl.
CPC ....... *H04W 48/12* (2013.01); *H04W 72/1263* (2013.01); *H04W 36/0061* (2013.01); *H04W 72/04* (2013.01); *H04W 72/0406* (2013.01)

(58) Field of Classification Search
CPC ................................................ H04W 72/1263
See application file for complete search history.

(56) References Cited

U.S. PATENT DOCUMENTS

| | | | |
|---|---|---|---|
| 2003/0036399 A1* | 2/2003 | Casaccia et al. | 455/515 |
| 2006/0188036 A1* | 8/2006 | Brunel et al. | 375/267 |
| 2009/0239498 A1* | 9/2009 | Lee et al. | 455/404.1 |
| 2009/0262693 A1* | 10/2009 | Wang et al. | 370/329 |
| 2009/0316603 A1* | 12/2009 | Amerga et al. | 370/254 |
| 2010/0183031 A1* | 7/2010 | Dalsgaard et al. | 370/474 |
| 2010/0227611 A1* | 9/2010 | Schmidt et al. | 455/434 |

(Continued)

*Primary Examiner* — Bunjob Jaroenchonwanit
(74) *Attorney, Agent, or Firm* — Brundidge & Stranger, P.C.

(57) ABSTRACT

The invention provides for method, system and node for 'System Information' (SI) message communication in an LTE deployed wireless communication system comprising of mapping at least a System Information Block (SIB) message into a System Information (SI) message in which SIB messages of same periodicity are mapped to a single SI message. The method further comprising segmenting dynamically the SI message exceeding predefined threshold value of SI bits known a priori that can be transmitted in any one subframe and transmitting the segmented SI messages in the corresponding SI-window wherein, the transmitted segment is indicated as part of previously transmitted segment via one bit indication taken out from the maximum number of bits that can be transmitted in a subframe and wherein if the indication bit is set to '1' then the segment is part of previous frame that had non-zero indication bit and if indication bit is '0' then the segment is the last segment of the System Information message. The method further decodes the segment by de-scrambling SI-RNTI; buffering the received segments based on indication bit; and assembling the received segments to form a single SI message, upon receiving the last segment indicated by the indication bit.

7 Claims, 5 Drawing Sheets

(56) References Cited

U.S. PATENT DOCUMENTS

| | | | |
|---|---|---|---|
| 2010/0272017 A1* | 10/2010 | Terry et al. | 370/328 |
| 2011/0117912 A1* | 5/2011 | Mahajan et al. | 455/434 |
| 2012/0099515 A1* | 4/2012 | Chen et al. | 370/315 |
| 2012/0289286 A1* | 11/2012 | Miki | 455/552.1 |
| 2013/0155954 A1* | 6/2013 | Wang et al. | 370/328 |
| 2013/0258953 A1* | 10/2013 | Huang et al. | 370/329 |
| 2014/0003301 A1* | 1/2014 | Madan et al. | 370/280 |
| 2014/0086145 A1* | 3/2014 | Ramkumar et al. | 370/328 |
| 2014/0241260 A1* | 8/2014 | Schmidt et al. | 370/329 |

* cited by examiner

FIG. 1
PRIOR ART

| SI | Periodicity | SIBs mapped | SF | SFN |
|---|---|---|---|---|
| SI1 | rf8 | SIB2, SIB3 | 0 | 0, 8, 16, 24 |
| SI2 | rf8 | SIB4, SIB5 | 5 | 0, 8, 16, 24 |
| SI3 | rf16 | SIB6 | 0 | 1, 17, 33, 49 |

SI Window Length = 5ms

| LTE-FDD | D-U | D-U | D-U | D-U | D-U | D-U | D-U | D-U | D-U | D-U |
|---|---|---|---|---|---|---|---|---|---|---|
| SF# | 0 | 1 | 2 | 3 | 4 | 5 | 6 | 7 | 8 | 9 |
| SFN 0 | SI1 (SI-RNTI) | SI1 (SI-RNTI) | SI1 (SI-RNTI) | SI1 (SI-RNTI) | SI1 (SI-RNTI) | SIB1-(RNTI) | SI2 (SI-RNTI) | SI2 (SI-RNTI) | SI2 (SI-RNTI) | SI2 (SI-RNTI) |
| SFN 1 | SI3 (SI-RNTI) | SI3 (SI-RNTI) | SI3 (SI-RNTI) | SI3 (SI-RNTI) | SI3 (SI-RNTI) | | | | | |
| SFN 2 | | | | | | SIB1-(RNTI) | | | | |
| SFN 3 | | | | | | | | | | |
| SFN 4 | | | | | | SIB1-(RNTI) | | | | |
| SFN 5 | | | | | | | | | | |
| SFN 6 | | | | | | SIB1-(RNTI) | | | | |
| SFN 7 | | | | | | | | | | |
| SFN 8 | SI1 (SI-RNTI) | SI1 (SI-RNTI) | SI1 (SI-RNTI) | SI1 (SI-RNTI) | SI1 (SI-RNTI) | SIB1-(RNTI) | SI2 (SI-RNTI) | SI2 (SI-RNTI) | SI2 (SI-RNTI) | SI2 (SI-RNTI) |
| SFN 9 | | | | | | | | | | |
| SFN 10 | | | | | | SIB1-(RNTI) | | | | |
| SFN 11 | | | | | | | | | | |
| SFN 12 | | | | | | SIB1-(RNTI) | | | | |
| SFN 13 | | | | | | | | | | |
| SFN 14 | | | | | | SIB1-(RNTI) | | | | |
| SFN 15 | | | | | | | | | | |
| SFN 16 | SI1 (SI-RNTI) | SI1 (SI-RNTI) | SI1 (SI-RNTI) | SI1 (SI-RNTI) | SI1 (SI-RNTI) | SIB1-(RNTI) | SI2 (SI-RNTI) | SI2 (SI-RNTI) | SI2 (SI-RNTI) | SI2 (SI-RNTI) |
| SFN 17 | SI3 (SI-RNTI) | SI3 (SI-RNTI) | SI3 (SI-RNTI) | SI3 (SI-RNTI) | SI3 (SI-RNTI) | | | | | |

FIG. 2

| SI | Periodicity | SIBs mapped | SF | SFN |
|---|---|---|---|---|
| SI1 | rf8 | SIB2, SIB3, SIB4, SIB5 | 0 | 0, 8, 16, 24 |
| SI2 | rf16 | SIB6 | 5 | 0, 16, 32, 48 |

SI Window Length = 5ms

| LTE-FDD | D-U 0 | D-U 1 | D-U 2 | D-U 3 | D-U 4 | D-U 5 | D-U 6 | D-U 7 | D-U 8 | D-U 9 |
|---|---|---|---|---|---|---|---|---|---|---|
| SF# | | | | | | | | | | |
| SFN 0 | SI1S1 (SI-RNTI) | SI1S2 (SI-RNTI) | SI1S3 (SI-RNTI) | SI1S4 (SI-RNTI) | SI1S5 (SI-RNTI) | SIB1 (SI-RNTI) | SI1S1 (SI-RNTI) | SI1S2 (SI-RNTI) | SI1S1 (SI-RNTI) | SI1S2 (SI-RNTI) |
| SFN 1 | | | | | | | | | | |
| SFN 2 | | | | | | SIB1 (SI-RNTI) | | | | |
| SFN 3 | | | | | | | | | | |
| SFN 4 | | | | | | SIB1 (SI-RNTI) | | | | |
| SFN 5 | | | | | | | | | | |
| SFN 6 | | | | | | SIB1 (SI-RNTI) | | | | |
| SFN 7 | | | | | | | | | | |
| SFN 8 | SI1S6 (SI-RNTI) | SI1S1 (SI-RNTI) | SI1S2 (SI-RNTI) | SI1S1 (SI-RNTI) | SI1S2 (SI-RNTI) | SIB1 (SI-RNTI) | | | | |
| SFN 9 | | | | | | | | | | |
| SFN 10 | | | | | | SIB1 (SI-RNTI) | | | | |
| SFN 11 | | | | | | | | | | |
| SFN 12 | | | | | | SIB1 (SI-RNTI) | | | | |
| SFN 13 | | | | | | | | | | |
| SFN 14 | | | | | | SIB1 (SI-RNTI) | | | | |
| SFN 15 | | | | | | | | | | |
| SFN 16 | SI1S3 (SI-RNTI) | SI1S4 (SI-RNTI) | SI1S1 (SI-RNTI) | SI1S2 (SI-RNTI) | SI1S3 (SI-RNTI) | SIB1 (SI-RNTI) | SI2S3 (SI-RNTI) | SI2S2 (SI-RNTI) | SI2S1 (SI-RNTI) | SI2S3 (SI-RNTI) |
| SFN 17 | | | | | | | | | | |

SYSTEM INFORMATION MESSAGE COMMUNICATION BY DYNAMIC SEGMENTING OF SI MESSAGES IN A WIRELESS COMMUNICATION SYSTEM

FIELD OF THE INVENTION

The present disclosure relates 'System Information' message communication in LTE deployed wireless communication systems.

BACKGROUND

The Long Term Evolution (LTE) is a new terrestrial mobile communication standard currently being standardized by the 3GPP ($3^{rd}$ Generation Partnership Project). The Radio Access Network (RAN) of LTE is named as the Evolved-Universal Mobile Telecommunication Systems Radio Access Network (E-UTRAN). The E-UTRAN physical layer is based on Orthogonal Frequency Division Multiplexing (OFDM). More precisely; the downlink transmission scheme is based on conventional OFDM using a cyclic prefix while the uplink transmission is based on single carrier frequency division multiple access (SC-FDMA) techniques. LTE supports both frequency division duplex (FDD) and time division duplex (TDD).

System Information (SI) in an LTE system is divided into a number of System Information Blocks (SIBs) and Master Information Block (MIB). The MIB includes limited number of most essential and frequently transmitted parameters to acquire other information from the cell. SI is defined in 3GPP TS 36.300 as a Radio Resource Control (RRC) message carrying a number of System Information Blocks (SIBs) that have the same periodicity. Each System Information Block (SIB) contains a set of related system information parameters. System Information BlockType1 (SIB1) is transmitted alone, separately from other SI-messages. SIBs other than SIB1 are carried in SI messages and mapping of System Information Blocks to SI messages is flexibly configurable by using scheduling Information parameters included in SIB1, with restrictions that each SIB is contained only in a single SI message. Only SIBs having the same scheduling (periodicity) requirement can be mapped to the same SI message. In the prior art, the number of SI bits that can be transmitted in any subframe is limited and the SI message should be transmitted in one subframe.

This limits the number of System Information Block (SIB) messages that can be mapped to a single SI message. This decreases the number of SIB messages that can be mapped to a single SI message thereby delaying the acquisition of SI messages by UE, which as a consequence increases the power consumption of UE.

Therefore there is a need to provide flexibility in mapping SIB messages to a single SI message thereby providing opportunity for faster acquisition of SI messages by User Equipment (UE), which as a consequence reduces the UE power consumption.

SUMMARY

The summary represents the simplified condensed version of the claimed subject matter and it is not an extensive disclosure of the claimed subject matter. The summary neither identifies key or critical elements nor delineates the scope of the claimed subject matter. The summary presents the simplified form of the claimed subject matter and acts as a prelude to the detailed description that is given below.

The present invention and its embodiments are made to provide for a feasible solution for 'System Information' (SI) message communication in an LTE deployed wireless communication system.

The method of the invention provides for 'System Information' (SI) message communication in an LTE deployed wireless communication system comprising of mapping at least a System Information Block (SIB) message into a System Information (SI) message in which SIB messages of same periodicity are mapped to a single SI message. The method further comprising of segmenting dynamically the SI message exceeding predefined threshold value known a priori that can be transmitted in any one subframe. The method further comprises of signaling the dynamic SI configuration information over SIB Type 1 (SIB1) and transmitting the segmented SI messages in the corresponding SI-window wherein, the transmitted segment is indicated as part of previously transmitted segment via one bit indication taken out from the maximum number of bits that can be transmitted in a subframe and wherein if the indication bit is set to '1' then the segment is part of previous frame that had non-zero indication bit and if indication bit is '0' then the segment is the last segment of the System Information message.

The method further comprising of receiving the SI configuration information over SIB Type 1 (SIB1) and receiving SI-Segments scrambled with SI-RNTI; decoding the received SI-Segments by de-scrambling SI-RNTI; and buffering the received segments as part of previously transmitted segment if one bit indication is received with bit set to '1' for all transmitted segments and assembling the received segments to form a single SI message if indication bit '0' is received as part of last segment.

Another aspect relates to system facilitating the above method of 'System Information' (SI) message communication in an LTE deployed wireless communication system. Another aspect relates to eNodeB and User Equipment (UE) facilitating the above method of 'System Information' (SI) message communication in an LTE deployed wireless communication system.

Other aspects, advantages, and salient features of the invention will become apparent to those skilled in the art from the following detailed description, which, taken in conjunction with the annexed drawings, discloses exemplary embodiments of the invention.

DESCRIPTION OF THE DRAWINGS

The features, advantages and other aspects of the embodiments of the present invention will be obvious to any person skilled in the art to appreciate the invention when read with the following description taken in conjunction with the accompanying drawings.

The figures are not drawn to scale and are illustrated for simplicity and clarity to help understand the various embodiments of the present invention. Throughout the drawings it should be noted that like reference numbers are used to depict the same or similar elements, features and structures.

DETAILED DESCRIPTION

The following descriptions with reference to the accompanying drawings are provided to assist in a comprehensive understanding of exemplary embodiments of the invention as defined by the claims and their equivalents. Accordingly, those of ordinary skill in the art will recognize that various changes and modifications of the embodiments described herein can be made without departing from the scope and spirit of the invention.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

In the figures certain embodiments are shown in block diagrams in order to facilitate describing those embodiments. The term module, system and the like are intended to refer to an entity or entities within a communication network node comprising of; hardware, software, a combination of hardware and software. For e.g., module may be, but not limited to being, a process running on a processor, a processor, an integrated circuit, or a computer. Both an application running on a computing device and the computing device can be a module. A module may be localized on one computer and/or distributed between two or more computers. The components may communicate by way of local and/or remote processes.

The present invention and its embodiments are mainly described in relation to 3GPP specifications and standards (LTE-Advanced) for applicability of certain exemplary embodiments. For exemplary purposes only, most of the embodiments are outlined according to the LTE-Advanced mobile communication system with the solution to the problem discussed in the background. The terminology used is therefore related thereto. Such terminology is used in the context of describing the embodiments of the invention and it does not limit the invention in any way. Any other network architecture or system deployment, etc., may be applicable for/in any kind of modern and future communication network including any mobile/wireless communication networks/systems as long as it is compliant with the features described herein.

The techniques described herein may be used for various wireless communication networks such as Code Division Multiple Access (CDMA) networks, CDMA implementing radio technology such as Universal Terrestrial Radio Access (UTRA), Time Division Multiple Access (TDMA) networks, TDMA implementing radio technology such as GSM (Global System for Mobile Communication), Frequency Division Multiple Access (FDMA) networks, Orthogonal Frequency Division Multiple Access (OFDMA) networks, OFDMA implementing radio technology such as Evolved URTA (E-UTRA), SC-FDMA networks. This invention is applicable to Frequency Division Duplex (FDD) as well as Time Division Duplex (TDD).

User equipment (UE) used in the following description denotes various terminologies used like an access terminal (AT), wireless communication device, terminal, wireless handset, computer or wireless module, wireless module for use with a computer, personal digital assistant (PDA), tablet computer or device.

In 3GPP LTE, a Base station may be referred to as evolved Node B or eNodeB. For the sake of simplicity and brevity in the following description the term eNodeB used generically to mean the functions performed by nodes referred to in the context of explaining functions associated with a 'Base station', Access Point, a Node B, an enhanced Node B, Base station, Evolved Node B, eNB, radio access stations (RASs), or Base Transceiver Stations (BTSs) and the like.

LTE system information is one of the key aspects of the air interface. It consists of the Master Information Block (MIB) and a number of System Information Blocks (SIBs). The MIB carries the most essential information that is needed for the UE to acquire other information from the cell. It includes the downlink channel bandwidth, the Physical Hybrid ARQ Indicator Channel (PHICH) configuration, the SFN (System Frame Number) which helps with synchronization and acts as a timing reference the eNodeB transmit antenna configuration etc. The MIB is broadcast on the Physical Broadcast Channel (PBCH), while SIBs are sent on the Physical Downlink Shared Channel (PDSCH) through Radio Resource Control (RRC) messages. SIB1 is carried by "System Information Block Type1" message. It includes information related to UE cell access and defines the schedules of other SIBs, such as the PLMN Identities of the network, the tracking area code (TAC) and cell ID, cell barring status, to indicate if a UE may camp on the cell or not, transmissions times and periodicities of other SIBs etc. SIB2 and other SIBs are carried by "System Information (SI)" message.

The SIB2 contains radio resource configuration information common for all UEs, including the uplink carrier frequency and the uplink channel bandwidth (in terms of the number of Resource Blocks, for example n25, n50), the Random Access Channel (RACH) configuration, the paging configuration such as the paging cycle etc.

SIB3 contains information common for intra-frequency, inter-frequency, and/or inter-RAT cell reselection. SIB4 contains the intra-frequency neighboring cell information for Intra-LTE intra-frequency cell reselection, such as neighbor cell list, black cell list, and Physical Cell Identities (PCIs) for Closed Subscriber Group (CSG etc. SIB5 contains the neighbor cell related information for Intra-LTE inter-frequency cell-reselection, such as neighbor cell list, carrier frequency, cell reselection priority, threshold used by the UE when reselecting a higher/lower priority frequency than the current serving frequency, etc. An SI message can contain one or several SIBs. LTE contemplates SIBs upto 32, which offers scope to map SIBs ranging from SIB 2 to SIB 32 in a single SI message. Only SIBs having the same scheduling (periodicity) requirement can be mapped to the same SI message. SIB2 is always mapped to the SI message that corresponds to the first entry in the list of SI messages in the scheduling information parameter.

The MIB uses a fixed schedule with a periodicity of 40 ms and repetitions made within 40 ms. The first transmission of the MIB is scheduled in subframe #0 of radio frames for which the System Frame Number (SFN) mod 4=0 and repetitions are scheduled in subframe #0 of all other radio frames. The SIB1 uses a fixed schedule with a periodicity of 80 ms and repetitions made within 80 ms. SIB1 is scheduled in subframe #5 of radio frames for which SFN mod 8=0 and repetitions are scheduled in subframe #5 of all other radio frames for which SFN mod 2=0. The SI messages are transmitted with periodically occurring time domain windows (referred to as SI-windows) using a dynamic scheduling mechanism.

Each SI message is associated with a SI-window and the SI-windows of different SI messages do not overlap. That is, within one SI-window only the corresponding SI is transmitted. The length of the SI-window is common for all SI messages and is configurable. Within the SI-window, the corresponding SI message can be transmitted a number of times in any subframe other than subframes where SIB1 is present (i.e. subframe #5 of radio frames for which SFN mod 2=0), any uplink subframes in Time Division Duplex (TDD) and any MBSFN subframes. SIB1 configures the SI window length and the transmission periodicity for the SI messages. For TDD networks, SIB1 configures TDD configuration which includes subframe Assignment and special Subframe Configuration. SIB2 configures the MBSFN (Multicast/Broadcast over a Single Frequency Network) subframe configuration which defines subframes that are reserved for MBSFN in downlink.

Referring to 3GPP Technical Specification (TS 36.331) System Information Block Type 1 (SIB1) includes the 'Scheduling Info List' parameter which contains the scheduling information for SI messages and mapping of SIB messages (SIB2 to SIB 32) to SI messages. Further it explains the SI acquisition procedure which includes determination of the start radio frame and start sub frame for the SI messages. From the above references it is understood that there is flexibility in mapping multiple SIBs to a single SI message. But the SI message has to be transmitted fully in one subframe and it can be transmitted any number of times within SI-window.

However, the associated problem is that the number of SI bits that can be transmitted in any subframe is limited. Maximum bits that can be transmitted in any sub frame is 456 considering the fact that modulation order for SI-RNTI has been fixed as Qm=2 (QPSK Modulation) wherein maximum value of I (TBS) for Qm=2 is 9 and by inferring that if Downlink Control Information (DCI) Format 1A is scrambled. Similarly the maximum number of bits that can be transmitted will be 256 bits if DCI Format 1C is scrambled with SI-RNTI. From the above, it can be inferred that the maximum number of bits of SI that can be transmitted in one subframe is 456 bits. This limits the number of SIB messages that can be mapped to a single SI message and may not be sufficient when multiple SIBs are mapped to a single SI message. Maximum number of Physical Resource Blocks (PRBs) that can be allocated for SI transfer is 3.

Figure 1:
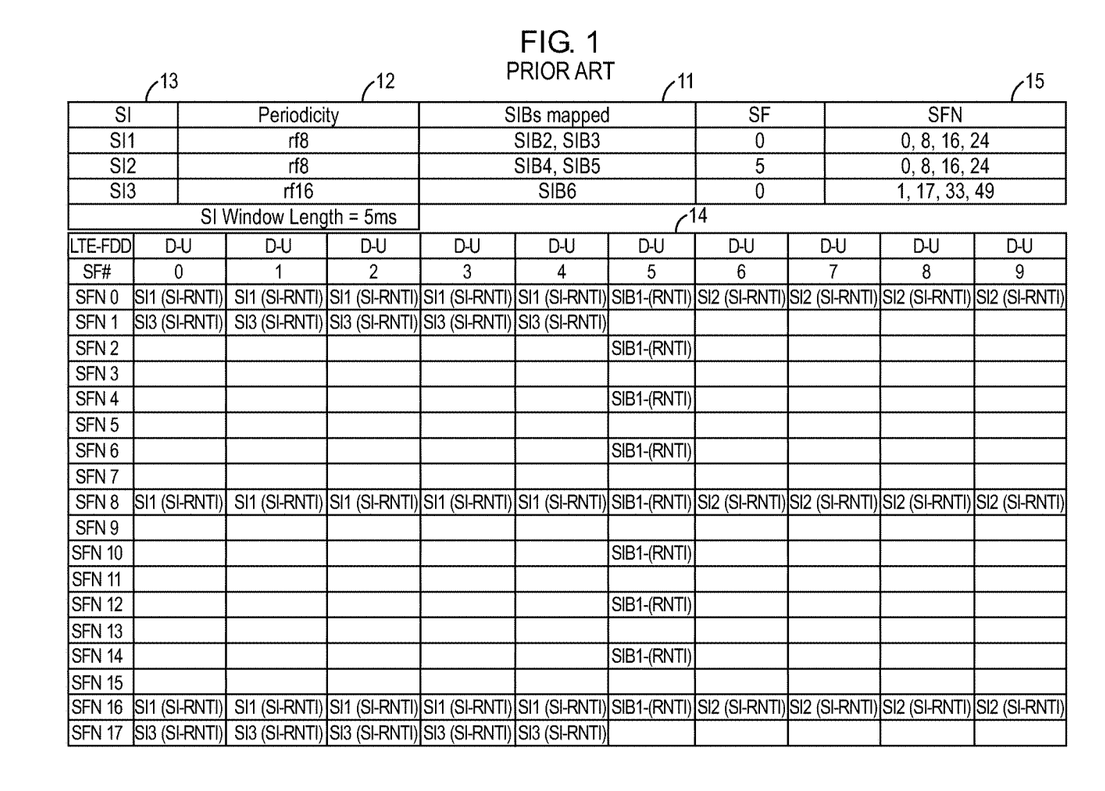
FIG. 1 illustrates mapping SIBs to an SI message and transmitting as per LTE deployed wireless communication systems as known in the prior art.

FIG. 1 illustrates mapping SIBs to an SI message and transmitting as per LTE deployed wireless communication systems as known in the prior art. SI message is bundled into Medium Access Control Service Data Unit (MAC SDU) and transported as 'Transparent Medium Access Control Protocol Data Unit (MAC PDU)' on Downlink Shared Channel (DLSCH). As an example SIB2 and SIB3 in column 11 are mapped to a single SI message SI1 as shown in column 13 having same periodicity as shown in column 12. Similarly SIB3 and SIB4 are mapped to SI message SI2 and SIB6 is mapped to SI3 based on the assumption that combined size of SIB2 and SIB3 is less than the predefined threshold value of bits (i.e., N bits) that can be transmitted in a single subframe and if SIB4 is added to the same SI, the total size of SIB2, SIB3, SIB4 exceeds the N bits.

Further it is assumed that SI-window length is 5 ms and the SI-periodicity of SI1, SI2 is 8 radio frames (i.e., 80 ms) and SI3 is 16 radio frames (i.e., 160 ms) as shown in column 15. Only SIB1 transmission is shown to overlap in the SI-window in the example on subframe 5 in radio frame SFN mod 2=0 as shown in column 14. Further it is assumed that Medium Access Control (MAC) scheduler schedules SI messages in all transmission opportunities in the corresponding SI-window. Scheduling requirements of SI1, SI2 and SI3 (Sub Frame (SF) and System Frame Number (SFN) on which SI are transmitted are derived as per 3GPP TS 36.331. From the FIG. 1 it is clear that SI1, SI2 and SI3 are scrambled with SI-RNTI and transmitted as a whole within each transmission opportunity in the corresponding SI-window.

Figure 2:
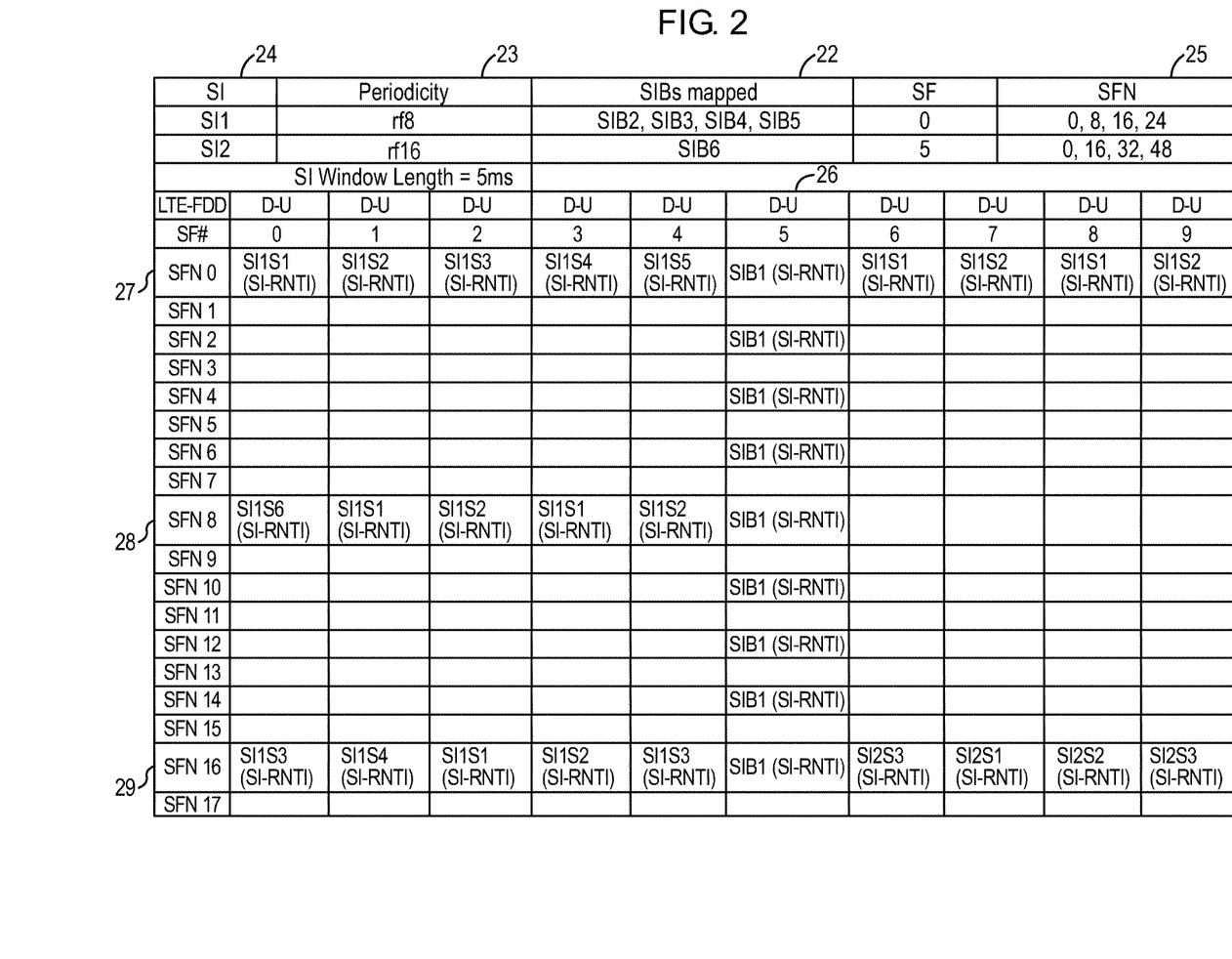
FIG. 2 is an illustrative representation of SIBs mapped to a single SI message and transmitting as per LTE deployed wireless communication system in accordance with the exemplary embodiments of the invention.

FIG. 2 is an illustrative representation of SIBs mapped to a single SI message and transmitting as per LTE deployed wireless communication system in accordance with the exemplary embodiments of the invention. The exemplary embodiments provides for enabling dynamic segmentation as there is flexibility in mapping SIBs to a single SI message. As an exemplary embodiment, the dynamic segmentation may be implemented in any scheduling device within an eNodeB or similar network elements deployed in a wireless communication system wherein, the predefined threshold value of SI bits that can be transmitted in a single subframe is known a priori. The scheduling device may be a MAC scheduler. In dynamic segmenting, the number of segments is not made available to the receiver. The number of segments is derived by the receiver based number of correctly received segments. If the segments are joined and MAC PDU check passes then there is no loss of any segment between MAC of transmitter and MAC of receiver. The information about whether a segment is part of previously transmitted segment or not is conveyed using a single bit, say last bit from the maximum number of bits that can be transmitted over the subframe. As long as the last bit (or part_of_segment bit) is one, the segments will be accumulated and when the last bit is zero the segments will be joined and decoded at the MAC layer As an example SIB2, SIB3, SIB4 SIB5 in column 22 are mapped to a single SI message SI1 as shown in column 24 having same periodicity as shown in column 23. Similarly SIB6 is mapped to SI message SI2 without the limitation of predefined threshold value of bits (i.e., N bits) that can be transmitted in a single subframe. Considering that the size of SI1 exceeds N bits (maximum number of bits that can be transmitted in a single transmission opportunity), SI1 is segmented based on the size of SI bits that can be transmitted in that subframe. $1^{st}$ segment of SI1 i.e., N bits in one subframe is designated as SI1 S1. In this example, an assumption is made that SFN0 is the start radio frame in the SI modification period. SI1S1 is transmitted in System Frame Number 0 (SFN0) as indicated in column 25 and in Sub Frame 0 (SF0) as indicated in row 27 by mapping it to SI-RNTI. Same process of segmentation is carried out until last bit of SI1 is accommodated and transmitted in the following sequence wherein SI1S2 is transmitted in SFN0, SF1 and similarly SI1S3 in SFN0, SF2, SI1S4 in SFN0, SF3 and SI1S5 in SFN0, SF4 all mapped to SI-RNTI as shown in row 27. The last segment SI1S6 is transmitted in SFN8, SF0 mapped to SI-RNTI which is the first transmission opportunity (subframe) in the next SI-window for SI1.

When dynamic segmentation is enabled, SI messages may be segmented into 'n' different segments (i.e., SI-Segment1, SI-Segment2, . . . SI-Segment n). The size of each segment may be determined on every transmission opportunity (i.e., subframe). This may result in variable number of segments for the SI message.

In the example given, SI1 is segmented into 2 segments dynamically and transmitted in SFN8, SF1 and SF2 and further segmented into 4 segments dynamically and transmitted in SFN8, SF3 and SF4 as shown in row 28 and transmitted in SFN16, SF0 and SF1 as shown in row 29. Further SI1 is segmented into 3 segments dynamically and transmitted in SFN 16, SF2, SF3 and SF4 as shown in row 22. Similarly SI2 is segmented into 2 segments dynamically and transmitted in SFN0, SF6 and SF7 and further SI2 is segmented into 3 segments dynamically and transmitted in SFN0, SF8 and SF9 as shown in row 27 and SFN16, SF6 as shown in row 29. Further SI2 is segmented again into 3 segments dynamically and transmitted in SFN 16, SF7, SF8 and SF9 as shown in row 29.

SIB1 is transmitted in SF5 in all radio frames for which SFN mod 2=0, as shown in column 26. All SI-Segments are transmitted after scrambling with SI-RNTI. The start radio frame and the start subframe for the SI message is determined by the known method in 3GPP TS 36.331. For the first transmission of the SI message in the modification period, the $1^{st}$ SI segment i.e., SI-Segment 1 maps to the first transmission opportunity within the corresponding SI-window. The subsequent SI-Segments may be transmitted on subsequent transmission opportunities, in order within the corresponding SI-windows.

If number of segments is greater than the number of transmission opportunities within the SI-window, the SI segments of the SI message may be continued to be transmitted in the next SI-window for the SI message. For further transmissions, the $1^{st}$ SI-Segment i.e., SI-Segment 1 need not map to the first opportunity within the SI-window.

Figure 3:
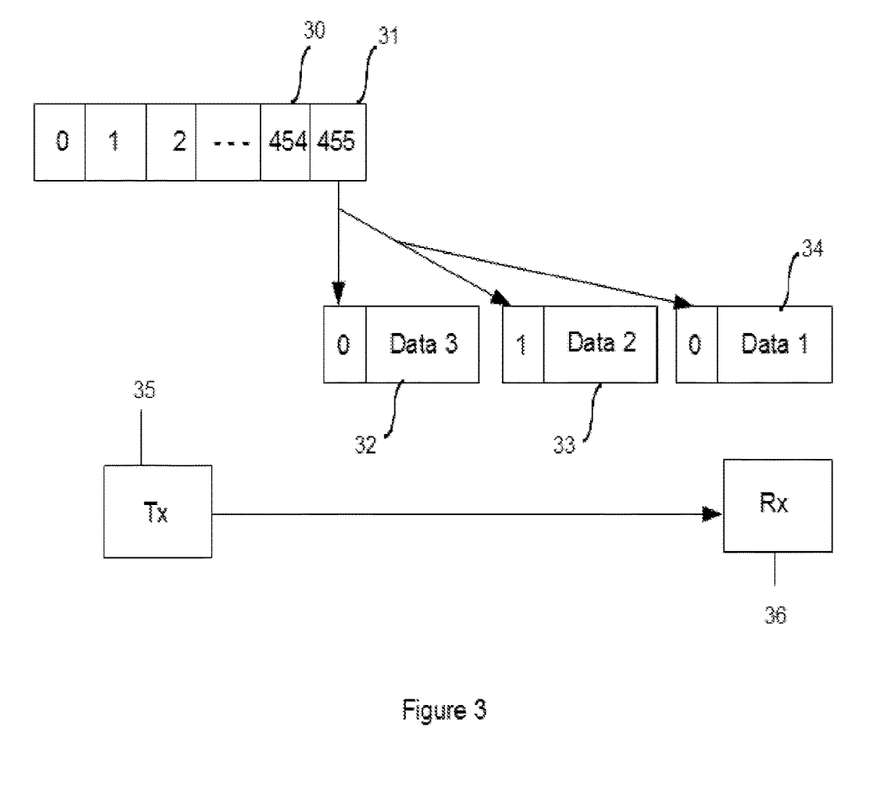
FIG. 3 represents indicating the transmitted segments as part of previously transmitted segments by using a 1 bit indication taken out from the maximum number of bits that can be transmitted in a subframe.

FIG. 3 represents the indication of the transmitted segments as part of previously transmitted segments by using a 1 bit indication taken out from the maximum number of bits that can be transmitted in a subframe. As an exemplary embodiment one bit is taken from the maximum number of permitted bits (as an example, 456 or 256) that can be transmitted in any one subframe. The preferred embodiment provides for taking the last bit 31 in the subframe 30 for using it as indication bit for indicating whether the segment is part of the previously transmitted segment. The subframes 32, 33 and 34 are shown carrying SI message segments before the data is scrambled with SI-RNTI (=OxFFDE). If the previous indication bit was set to zero and if the indication bit in the newly transmitted segment is 1 then the current segment is construed as the first segment. The receiver 36 as part of UE identifies that Data 1 is not part of the segment because indication bit is 0. Similarly receiver 36 identifies that Data 2 and Data 3 are segments of one SI message. Further the information about how many times a particular SI message is segmented is not present in SIB1. This is derived by MAC based on MAC layer check for correct data-unit reception.

A user equipment (UE) acquires the detailed time-domain scheduling (and other information e.g. frequency-domain scheduling, information on the used transport format etc.) from decoding the SI-RNTI on Physical Downlink Control Channel (PDCCH). A single SI-RNTI is used to address SIB1 as well as other SI messages. The UE acquires SIB1 and other SI messages on the Physical Downlink Shared Channel (PDSCH) resource indicated by decoding PDCCH with Cyclic Redundancy Check (CRC) scrambled by SI-RNTI with Downlink Control Information (DCI) Format 1A or 1C.

As an exemplary embodiment, the UE acquires the SI from SIB1 message and the transmitted SI-Segments by descrambling with SI-RNTI and decoding the received SI-Segments by de-scrambling SI-RNTI; and. UE assembles all the transmitted SI-Segments by buffering the received segments as part of previously transmitted segment if one bit indication is received for all transmitted segments and assembling the received segments to form a single SI message if indication bit '0' is received as part of last segment.

Figure 4:
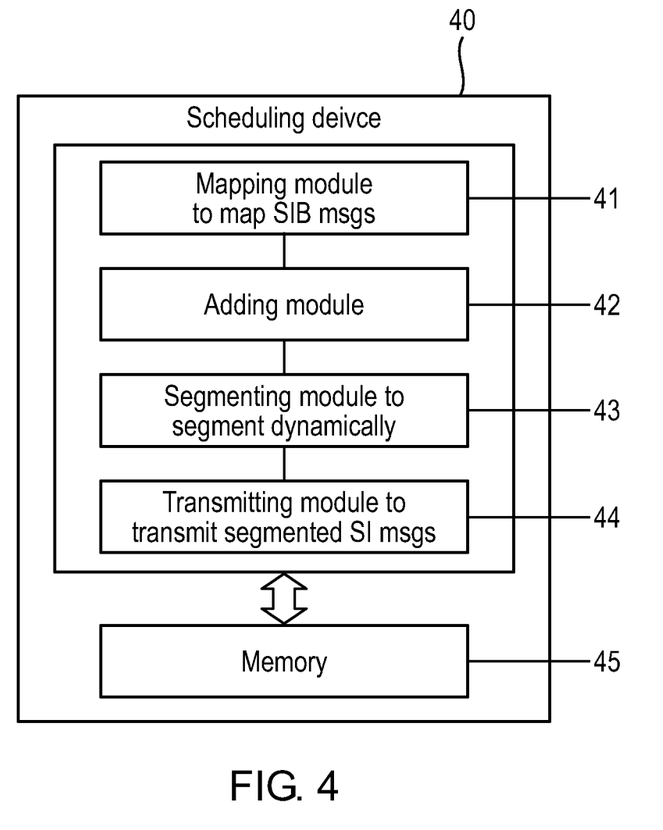
FIG. 4 is a block diagram representing the functions performed by scheduling device in accordance with the exemplary embodiments of the invention.

FIG. 4 is a block diagram representing the functions performed by a scheduling device 40 within an eNodeB or similar network elements deployed in a wireless communication system in accordance with the exemplary embodiments of the invention. The scheduling device 40 comprises of: a mapping module 41 adapted to map SIB messages of same periodicity to a single SI message; a segmenting module 43, adapted to segment dynamically the SI message exceeding predefined value of SI bits that can be transmitted in any one subframe and transmitting module 44, adapted to transmit the segmented SI messages in the corresponding SI-window, wherein, the transmitted segment is indicated as part of previously transmitted segment via one bit indication taken out from the maximum number of bits that can be transmitted in a subframe and wherein if the indication bit is set to '1' then the segment is part of previous frame that had non-zero indication bit and if indication bit is '0' then the segment is the last segment of the System Information message, and wherein, SI configuration information are transmitted over SIB type 1 (SIB1). Scheduling device 40 may also include a memory 45 that retains instructions for executing functions associated with modules 41, 42, 43, 44 and 45, as well as measured or computed data that may be generated during executing such functions.

Figure 5:
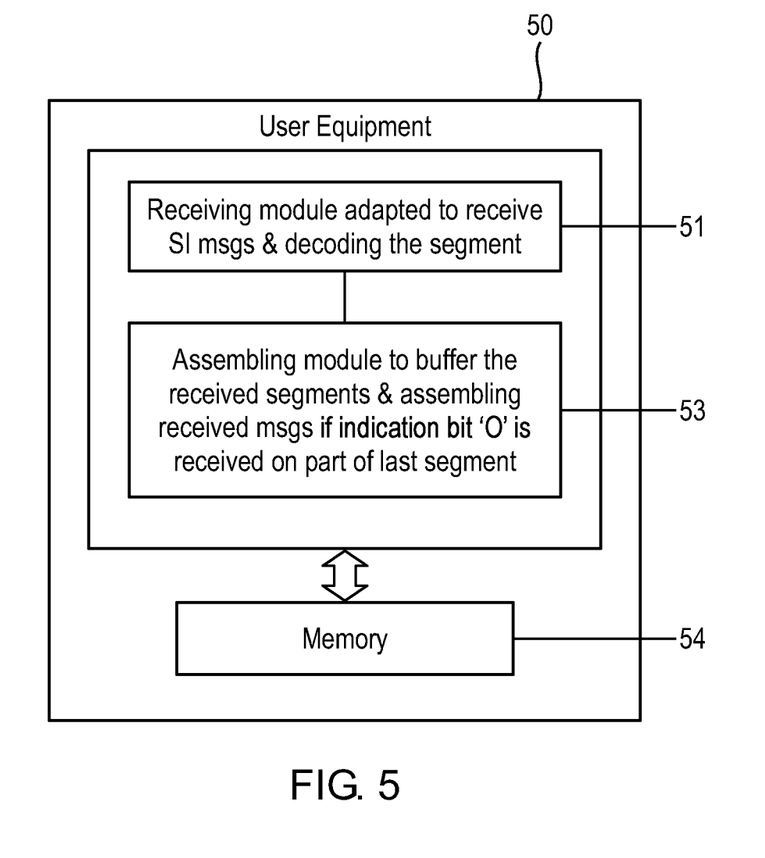
FIG. 5 is a block diagram representing the functions performed by the UE in accordance with the exemplary embodiments of the invention.

FIG. 5 is a block diagram representing the functions performed by an UE in accordance with the exemplary embodiments of the invention. The UE 50 comprises of: a receiving module 51, adapted to receive the SI configuration messages over SIB Type 1 (SIBI) signaling and the segmented SI messages by decoding the segment by de-scrambling SI-RNTI; and an assembling module 53, adapted to buffer the received segments as part of previously transmitted segment if one bit indication is received with bit set to '1' for all transmitted segments and assembling the received segments to form a single SI message if indication bit '0' is received as part of last segment. The UE 50 may also include a memory 54 that retains instructions for executing functions associated with modules 51, and 53, as well as measured or computed data that may be generated during executing such functions.

Memory described above can be any storage device including any kind of computer readable storage media, for example, RAM, EPROM, EEPROM, flash memory, registers, hard disks, CD-ROM, DVD, etc.

Another embodiment of the invention relates to the implementation of the above described various embodiments using hardware and software. It is recognized that the various embodiments of the invention may be implemented or performed using computing devices (processors). A computing device or processor may for e.g., be general purpose processors, digital signal processors (DSP), application specific integrated circuits (ASIC), field programmable gate arrays (FPGA) or other programmable logic devices, etc. The various embodiments of the invention may also be performed or embodied by a combination of these devices Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It is to be noted that respective functional blocks or elements according to above-described aspects can be implemented by any known means, either in hardware and/or software, respectively, if it is only adapted to perform the described functions of the respective parts. The mentioned method, steps can be realized in individual functional blocks or by individual devices, or one or more of the method, steps can be realized in a single functional block or by a single device.

The present invention also covers any conceivable combination of method steps and operations described above, and any conceivable combination of nodes, apparatuses, modules or elements described above, as long as the above-described concepts of methodology and structural arrangement are applicable.

It should be further noted that the individual features of the different embodiments of the invention may individually or in arbitrary combination be subject matter to another invention. It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

We claim:

1. A method performed in an LTE deployed wireless communication system comprising:
    mapping at least a System Information Block (SIB) message into a System Information (SI) message in which SIB messages of same periodicity are mapped to a single SI message; Segmenting dynamically the SI message exceeding predefined threshold value of SI bits that can be transmitted in any one subframe; and
    transmitting the segmented SI messages in a corresponding SI-window wherein, the transmitted segment is included as part of previously transmitted segment via one bit indication taken out from the maximum number of transmittable bits in a subframe and wherein when the indication bit is set to '1' then the segment is part of previous frame that had non-zero indication bit and when indication bit is '0' then the segment is the last segment of the System Information message.

2. The method of claim 1 wherein, each of the segmented SI message is transmitted in a single subframe wherein, the predefined threshold value of SI transmittable bits in a single subframe is known prior to transmission to the single subframe.

3. A method performed in an LTE deployed wireless communication system comprising:
    receiving System Information ("SI") configuration information over SIB Type 1 (SIBI) and receiving SI-Segments scrambled with SI-RNTI;
    decoding the received SI-Segments by de-scrambling SI-RNTI; and
    buffering the received segments as part of previously transmitted segment when one bit indication is received with bit set to '1' for all transmitted segments and assembling the received segments to form a single SI message when indication bit '0' is received as part of last segment.

4. The eNodeB in an LTE deployed wireless communication system comprising:
    a mapping module, comprising circuitry that maps SIB messages of same periodicity to a single SI message;
    a segmenting module, comprising circuitry that segments dynamically the SI message exceeding predefined threshold value of SI bits that can be transmitted in any one subframe; and
    a transmitting module, comprising circuitry that transmits the segmented SI messages in a corresponding SI-window, wherein, the transmitted segment is included as part of previously transmitted segment via one bit indication taken out from the maximum number of transmittable bits in a subframe and wherein when the indication bit is 1 then the segment is part of previous frame that had non-zero indication bit and when indication bit is '0' then the segment is the last segment of the System Information message.

5. The User Equipment (UE) in an LTE deployed wireless communication system comprising:
    a receiving module, comprising circuitry that receives the SI configuration information over SIB Type 1 (SIBI) signaling and the segmented SI messages by decoding the segment by de-scrambling SI-RNTI; and
    an assembly module, comprising circuitry that buffers the received segments as part of previously transmitted segment when one bit indication is received for all transmitted segments and assembling the received segments to form a single SI message when indication bit '0' is received as part of last segment.

6. The Wireless communication system comprising:
    an eNodeB for SI message communication on a wireless channel over which the transmitter and receivers communicate in an LTE deployed wireless communication system comprising of:
    a mapping module, comprising circuitry that maps SIB messages of same periodicity to a single SI message;
    a segmenting module, comprising circuitry that segments dynamically the SI message exceeding predefined threshold value of SI bits that can be transmitted in any one subframe; and
    a transmitting module, comprising circuitry that transmits the segmented SI messages in a corresponding SI-window, wherein, the transmitted segment is included as part of previously transmitted segment via one bit indication taken out from the maximum number of transmittable bits in a subframe and wherein when the indication bit is set to '1' then the segment is part of previous frame that had non-zero indication bit and when indication bit is '0' then the segment is the last segment of the System Information message.

7. The Wireless Communication System of claim 6 further comprising:
    an UE for SI message communication on a wireless channel over which the transmitter and receivers communicate in an LTE deployed wireless communication system comprising of:
    a receiving module, comprising circuitry that receives the SI configuration information over SIB Type 1 (SIBI) signaling and the segmented SI messages by decoding the segment by de-scrambling SI-RNTI; and
    an assembly module, comprising circuitry that buffers the received segments as part of previously transmitted segment when one bit indication is received with bit set to '1' for all transmitted segments and assembling the received segments to form a single SI message when indication bit '0' is received as part of last segment.

\* \* \* \* \*